(12) United States Patent
Froelicher et al.

(10) Patent No.: US 10,477,867 B2
(45) Date of Patent: Nov. 19, 2019

(54) OVEN APPLIANCE WITH AIR CURTAIN

(71) Applicant: Haier US Appliance Solutions, Inc., Wilmington, DE (US)

(72) Inventors: Stephen Bernard Froelicher, Louisville, KY (US); Kevin Farrelly Nolan, Louisville, KY (US); Christopher James Adelmann, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 329 days.

(21) Appl. No.: 15/218,143

(22) Filed: Jul. 25, 2016

(65) Prior Publication Data

US 2018/0020681 A1 Jan. 25, 2018

(51) Int. Cl.
*A21B 1/26* (2006.01)
*A21B 3/02* (2006.01)

(52) U.S. Cl.
CPC .................................. *A21B 3/02* (2013.01)

(58) Field of Classification Search
CPC ..... A47J 37/0641; A47J 37/0658; A21B 1/40; A21B 3/02; A21B 3/04; F24B 5/02
USPC ...... 219/392, 395, 398; 126/15 A, 15 R, 193
See application file for complete search history.

(56) References Cited

U.S. PATENT DOCUMENTS

| | | | | |
|---|---|---|---|---|
| 3,313,917 A | * | 4/1967 | Ditzler | F24C 15/325 126/21 A |
| 5,000,085 A | * | 3/1991 | Archer | A47J 37/0623 126/21 A |
| 7,060,940 B2 | * | 6/2006 | Kim | F24C 7/06 126/193 |
| 7,604,000 B2 | | 10/2009 | Wolfe et al. | |
| 2008/0099008 A1 | * | 5/2008 | Bolton | A21B 1/245 126/21 A |
| 2014/0216434 A1 | | 8/2014 | Moreth, III et al. | |

\* cited by examiner

*Primary Examiner* — Tu B Hoang
*Assistant Examiner* — Erin E McGrath
(74) *Attorney, Agent, or Firm* — Dority & Manning, P.A.

(57) ABSTRACT

An oven appliance includes a cooking chamber disposed within a housing with an opening in the housing for accessing the chamber. A casing is disposed around the opening, and the casing includes an air curtain outlet configured to prevent smoke and other vapors from escaping the cooking chamber to the ambient atmosphere via the opening.

16 Claims, 5 Drawing Sheets

OVEN APPLIANCE WITH AIR CURTAIN

FIELD OF THE INVENTION

The present subject matter relates generally to oven appliances, such as pizza oven appliances.

BACKGROUND OF THE INVENTION

Pizza ovens generally include a housing that defines a cooking chamber for receiving a pizza for cooking. A typical pizza oven housing provides an opening for accessing the cooking chamber. Heating elements, such as resistance heating elements, gas burners, or combusting wood, heat the cooking chamber to a suitable temperature. Certain pizza ovens operate the heating elements to heat the cooking chamber to high temperatures. For example, the operating temperatures of such pizza ovens can be higher than five hundred degrees Fahrenheit.

Heating food items within pizza ovens operating at high temperatures poses challenges. For example, byproducts, such as smoke, particulate matter, and cooking vapors, can be generated during high temperature operation, and such byproducts are undesirable in interior room ambient atmosphere outside of the pizza oven. However, such byproducts can escape via the opening.

Accordingly, a pizza oven with features for containing such byproducts within the pizza oven would be useful.

BRIEF DESCRIPTION OF THE INVENTION

The present subject matter provides an oven appliance with a baking stone positioned within a housing at a bottom portion of a cooking chamber. A controller is in operative communication with an upper heating element array, a lower heating element array, a pair of upper temperature sensors and a pair lower temperature sensors. The housing provides an opening for accessing the cooking chamber. A casing is disposed around the opening, and the casing includes an air curtain outlet configured to prevent cooking byproducts, e.g., vapors from escaping the cooking chamber to the ambient atmosphere via the opening. Additional aspects and advantages of the invention will be set forth in part in the following description, or may be apparent from the description, or may be learned through practice of the invention.

In a first exemplary embodiment, an oven appliance is provided. The oven appliance includes a housing that defines a cooking chamber. The housing also defines an opening for accessing the cooking chamber of the housing. An upper heating element array is positioned within the housing at a top portion of the cooking chamber. A baking stone is positioned within the housing at a bottom portion of the cooking chamber. A lower heating element array is positioned within the housing below the baking stone adjacent the bottom portion of the cooking chamber. A hollow casing is mounted to the housing at the opening of the housing, the hollow casing comprising an ambient air intake proximate to and contiguous with interior room ambient atmosphere about the housing, a smoke intake proximate to and contiguous with the cooking chamber, a venting exit proximate to and contiguous with the interior room ambient atmosphere about the housing, and an air curtain outlet proximate to the opening of the housing. An air handler is located within the hollow casing and operable to cause gases to flow into the ambient air intake and the smoke intake, such that the gases from each of the ambient air intake and the smoke intake intermix within the hollow casing and the mixed gases flow to the venting exit and to the air curtain outlet.

In a second exemplary embodiment, an oven appliance is provided. The oven appliance includes a housing that defines a cooking chamber. The housing also defines an opening for accessing the cooking chamber of the housing. An upper heating element array is positioned within the housing at a top portion of the cooking chamber. A reflector is positioned above the upper heating element array. A baking stone is positioned within the housing at a bottom portion of the cooking chamber. A lower heating element array is positioned within the housing below the baking stone adjacent the bottom portion of the cooking chamber. A hollow casing defines a lower portion, an upper portion, and one or more side portions, the one or more side portions extending vertically between the lower portion and the upper portion. The hollow casing extends around the opening of the housing. The lower portion of the casing comprises a plurality of air intakes contiguous with the interior room ambient atmosphere about the housing. The hollow casing defines a first air flow path from a first set of the air intakes to the upper portion of the casing via the cooking chamber, the hollow casing also defines a second air flow path from a second set of the air intakes to the upper portion of the casing via the one or more side portions providing relatively fresh, cool air to the upper portion. The upper portion further comprises a venting exit contiguous with the interior room ambient atmosphere about the housing and an air curtain outlet. The hollow casing also defines a confluence of the first air flow path and the second air flow path in the upper portion upstream of the venting exit and the air curtain outlet such that the confluent air can flow out of the upper portion via the venting exit and the air curtain outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
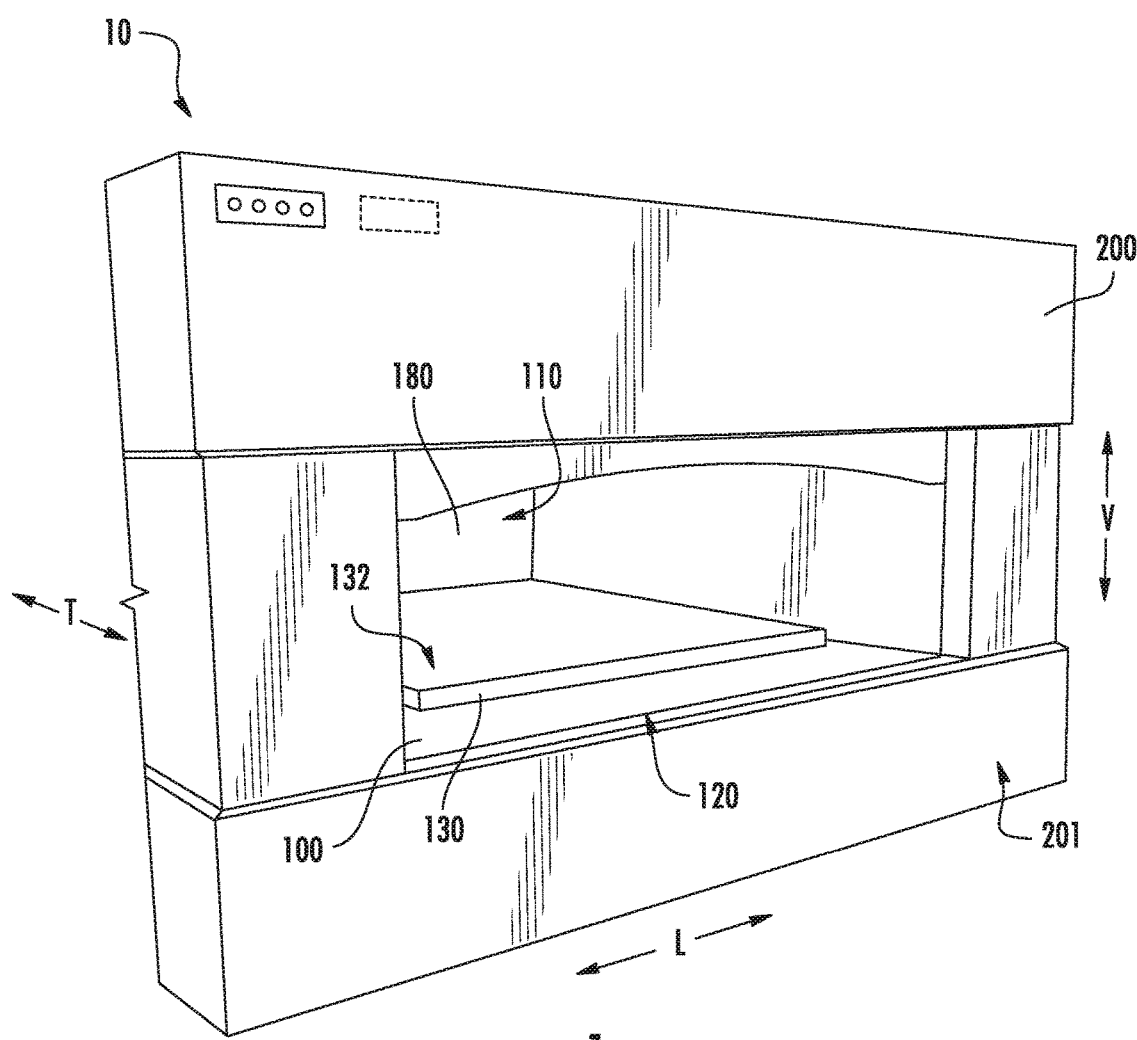
FIG. 1 provides a partial front, perspective view of an oven appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is to be understood that the use of terms such as "air" or "gases" herein are not necessarily limited to specific mixtures of gases or pure air but can also include various gases, vapors, and/or byproducts, such as smoke or particulate matter, and combinations thereof. For example, references in the following to various air flow paths are not limited to air only but can also accommodate flow of various fluids, such as the foregoing examples.

FIG. 1 provides a partial front, perspective view of an oven appliance 10 according to an exemplary embodiment of the present subject matter. As may be seen in FIG. 1, oven appliance 10 includes a housing 100 that defines a cooking chamber 110. Cooking chamber 110 is configured for receiving food items for cooking therein. In particular, housing 100 also defines an opening 120 for accessing cooking chamber 110. Opening 120 is positioned at a front portion 102 of housing 100, and a user of oven appliance 10 may place food items into and remove food items from cooking chamber 110 via opening 120. As may be seen in FIG. 1, cooking chamber 110 is open such that cooking chamber 110 is contiguous with or exposed to ambient atmosphere about oven appliance 10, e.g., about housing 100, via opening 120. Thus, oven appliance 10 does not include a door positioned at opening 120 for sealing opening 120, e.g., during normal operation of oven appliance 10.

A baking stone 130 is positioned within housing 100 at a bottom portion 114 of cooking chamber 110. Thus, baking stone 130 may form at least a portion of a floor of cooking chamber 110. Food items, such as pizza, may be placed directly on baking stone 130 during operation of oven appliance 10, as will be understood by those skilled in the art. Baking stone 130 may be constructed of or with any suitable material. For example, baking stone 130 may be constructed of or with a ceramic, clay or stone. In particular, baking stone 130 may be constructed of or with a porous ceramic or porous stone.

Oven appliance 10 also includes a manifold or casing 200. Casing 200 is mounted to housing 100 at opening 120 of housing 100. In particular exemplary embodiments, such as shown in FIG. 1, casing 200 may extend about opening 120 of housing 100. Thus, a user may reach through opening 120 into cooking chamber 110 at casing 200. Casing 200 may have any suitable shape and/or appearance. For example, casing 200 may be rectangular with flat elements as shown in FIG. 1. In alternative exemplary embodiments, casing 200 may include column shaped elements, rounded elements, etc. Casing 200 may be formed of or with any suitable material. For example, an outer surface 201 of casing 200 may be constructed of or with stainless steel, painted steel, enameled steel, copper or combinations thereof.

Figure 2:
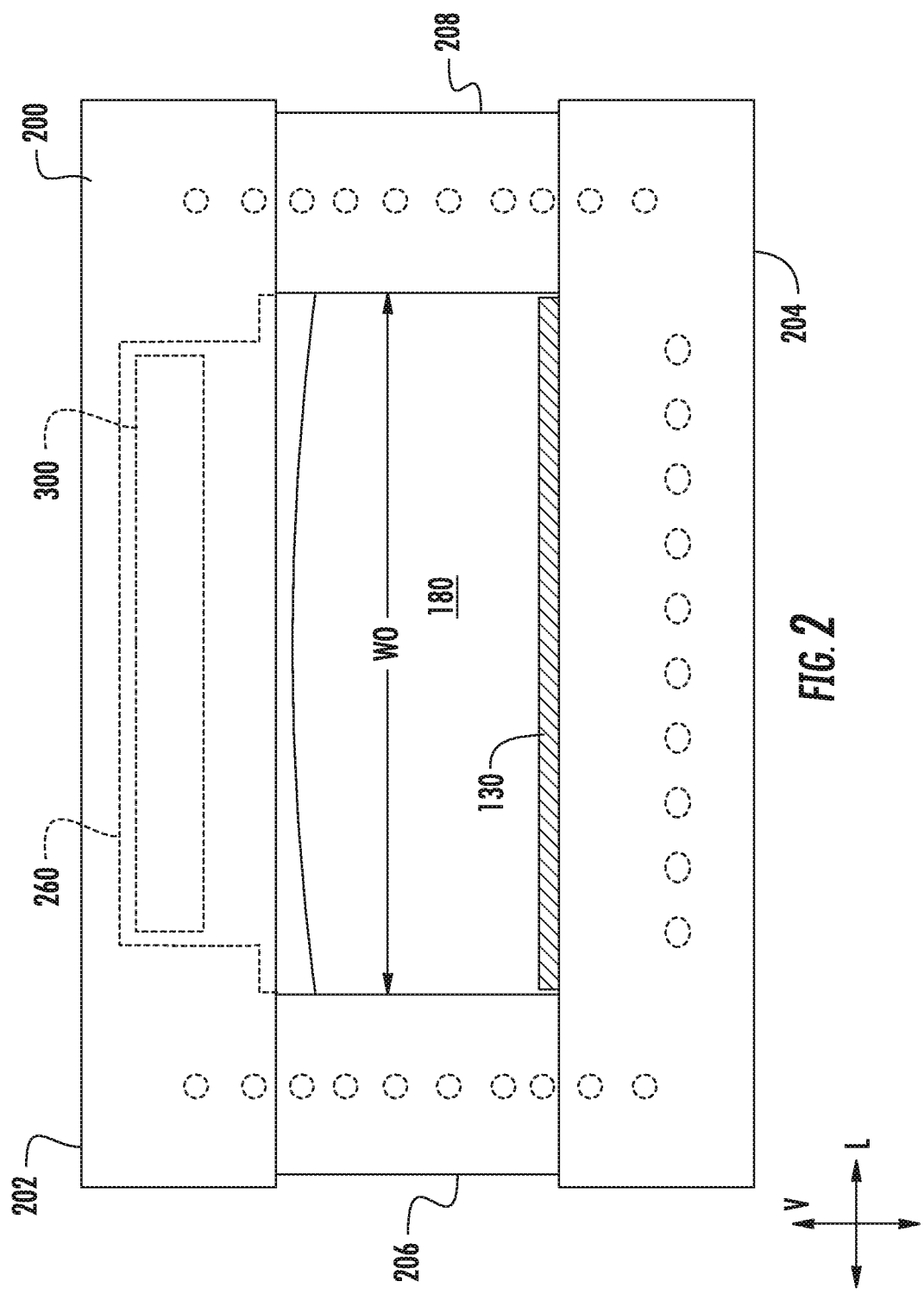
FIG. 2 provides a front elevation view of the exemplary oven appliance of FIG. 1.
Figure 3:
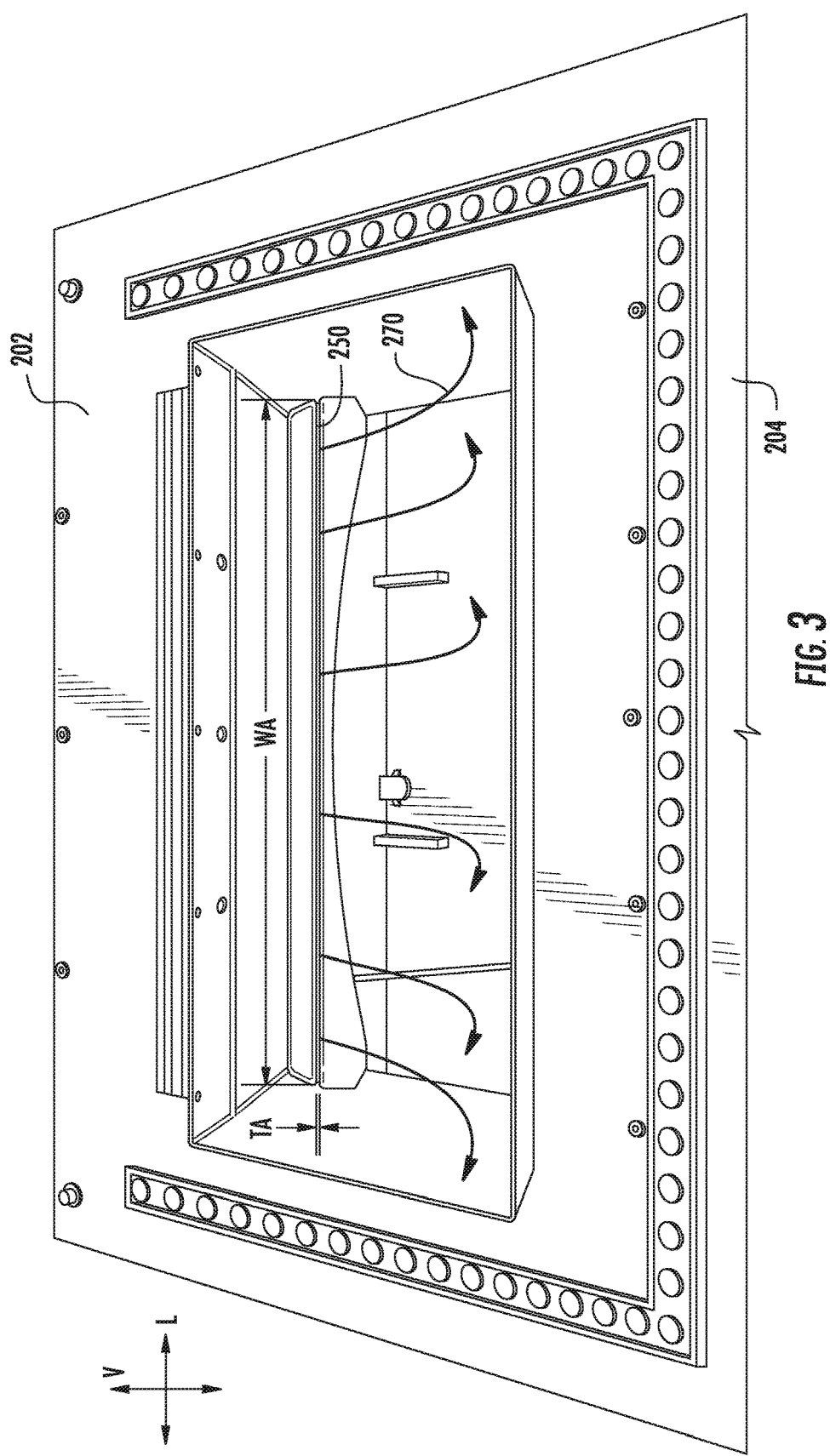
FIG. 3 provides a rear elevation view of a casing of the exemplary oven appliance of FIG. 1.
Figure 4:
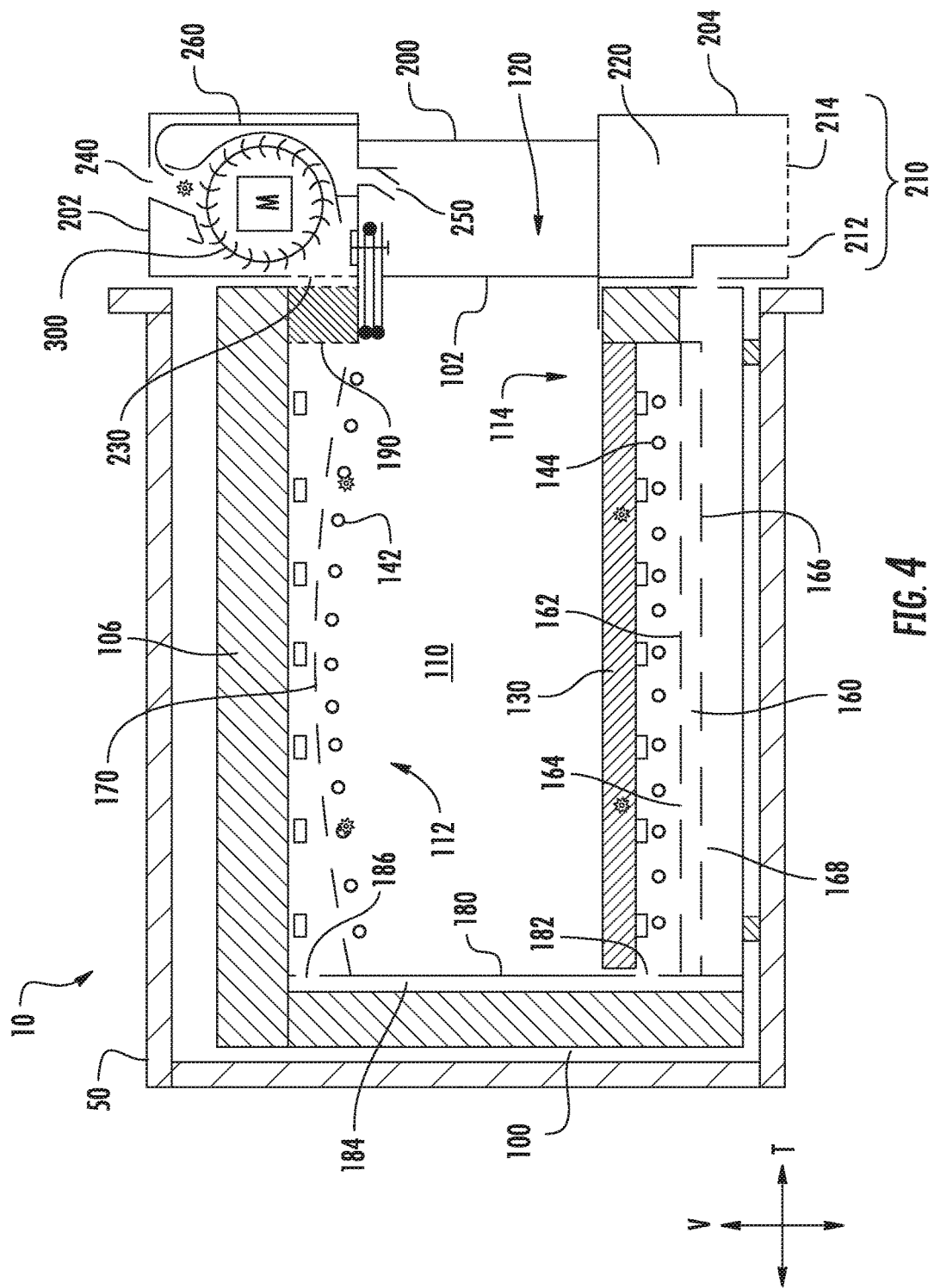
FIG. 4 provides a side section view of the exemplary oven appliance of FIG. 1 positioned within a cabinet.

FIG. 2 provides a front elevation view of an exemplary embodiment of oven appliance 10. FIG. 3 provides a rear elevation view of an exemplary embodiment of the casing 200. FIG. 4 provides a side section view of oven appliance 10 positioned within a cabinet 50. As may be seen, e.g., in FIGS. 2, 3 and 4 oven appliance 10 defines a vertical direction V, a lateral direction L and a transverse direction T. The vertical direction V, the lateral direction L and the transverse direction T are mutually perpendicular and form an orthogonal direction system. Various features of oven appliance 10 are discussed in greater detail below in the context of FIGS. 2, 3, 4 and 5.

Oven appliance 10 includes heating element arrays for heating cooking chamber 110 and food items therein. In particular, an upper heating element array 142 is positioned within housing 110 at a top portion 112 of cooking chamber 110. In addition, a lower heating element array 144 is positioned within housing 110 below baking stone 130 adjacent bottom portion 114 of cooking chamber 110. Thus, lower heating element array 144 may not be directly exposed to cooking chamber 110, and baking stone 130 may be positioned between cooking chamber 110 and lower heating element array 144, e.g., along the vertical direction V. In the illustrated examples, upper and lower heating element arrays 142, 144 are electrical heating element arrays. In certain exemplary embodiments, upper and lower heating element arrays 142, 144 are constructed of or with electrical resistance heating elements, such as calrods.

Oven appliance 10 includes various features for limiting or reducing heat transfer from cooking chamber 110 to cabinet 50. In the example illustrated in FIG. 4, oven appliance 10 includes insulation 106 within housing 100, e.g., such that housing 100 is an insulated housing. Also illustrated in FIG. 4 is insulation 106 positioned between cooking chamber 110 and cabinet 50. Oven appliance 10 can also include a baffle 160 positioned within housing 100 below lower heating element array 144. In such exemplary embodiments, baffle 160 limits or reduces heat transfer between lower heating element array 144 and a floor of cabinet 50. In the example illustrated in FIG. 4, baffle 160 includes an upper plate 162 and a lower plate 166. Upper plate 162 and lower plate 166 are spaced apart from each other, e.g., along the vertical direction V. In some exemplary embodiments, upper plate 162 defines a plurality of holes 164, and lower plate 166 also defines a plurality of holes 168. Thus, a thermal break may be formed between upper plate 162 and lower plate 166, e.g., along the vertical direction V.

As illustrated in FIG. 2, in some exemplary embodiments oven appliance 10 may include casing 200 comprising an upper portion 202, a lower portion 204, and one or more side portions 206, 208 extending vertically between the upper and lower portions 202 and 204. In some exemplary embodiments, such as is illustrated in FIG. 2, the opening 120 defines a width WO in the lateral direction and also illustrated in FIG. 2, back wall 180 of housing 100 can be seen through opening 120. Additionally, some exemplary embodiments can include air handler 300 and recirculation duct 260 in upper portion 202 of casing 200. Air handler 300 is operable to draw ambient air into intakes 210 and is operable to draw cooking byproducts, such as cooking fumes and/or smoke, into smoke inlet 230 of casing 200. Thus, air handler 300 may be provided to actively draw cooking byproducts 501 into casing 200.

As illustrated in FIG. 3, in some exemplary embodiments, air curtain outlet 250 can be oriented generally down from upper portion 202 of casing 200 towards lower portion 204 of casing 200 so as to form an air curtain 270 that extends vertically across the opening 120 of housing 100 during operation of the air handler 300, and air curtain outlet 250 may also be oriented generally back towards the opening 120 so as to form an air curtain 270 preventing cooking byproducts from escaping the cooking chamber 110 to the ambient atmosphere about housing 100 via the opening 120, e.g., along the transverse direction T. In some embodiments, such as is illustrated in FIG. 3, the air curtain outlet 250 defines a width WA in the lateral direction L and the width WA of the of the air curtain outlet 250 is substantially equal to the width WO of the opening 120. As used herein, the term "substantially" means within ten percent of the stated width when used in the context of widths. In some exemplary embodiments, such as is illustrated in FIG. 3, the air curtain outlet 250 defines a thickness TA in the transverse direction T. Those skilled in the art will recognize that the thickness TA of the air curtain outlet 250 may be selected to calibrate the velocity of the air curtain, e.g., because velocity equals volumetric flow rate divided by area. During operation, air handler 300 may provide an essentially constant air flow rate. The width WA of the air curtain outlet 250 is selected to conform to the width WO of the opening 120. The only remaining variable to determine the velocity of air curtain 270 can be the thickness TA of the air curtain outlet 250, thus, the selection of thickness TA assists with controlling the velocity of the air curtain 270. For example, by selecting the thickness TA of the air curtain outlet 250 to be relatively small, the area of the outlet 250 is decreased and with flow being constant during operation of the air handler 300, the air flow velocity out of the air curtain outlet 250 will be increased. As an example, the thickness TA of the air curtain outlet 250 may be no greater than a half an inch and no less than a sixteenth of an inch, in certain exemplary embodiments.

Figure 5:
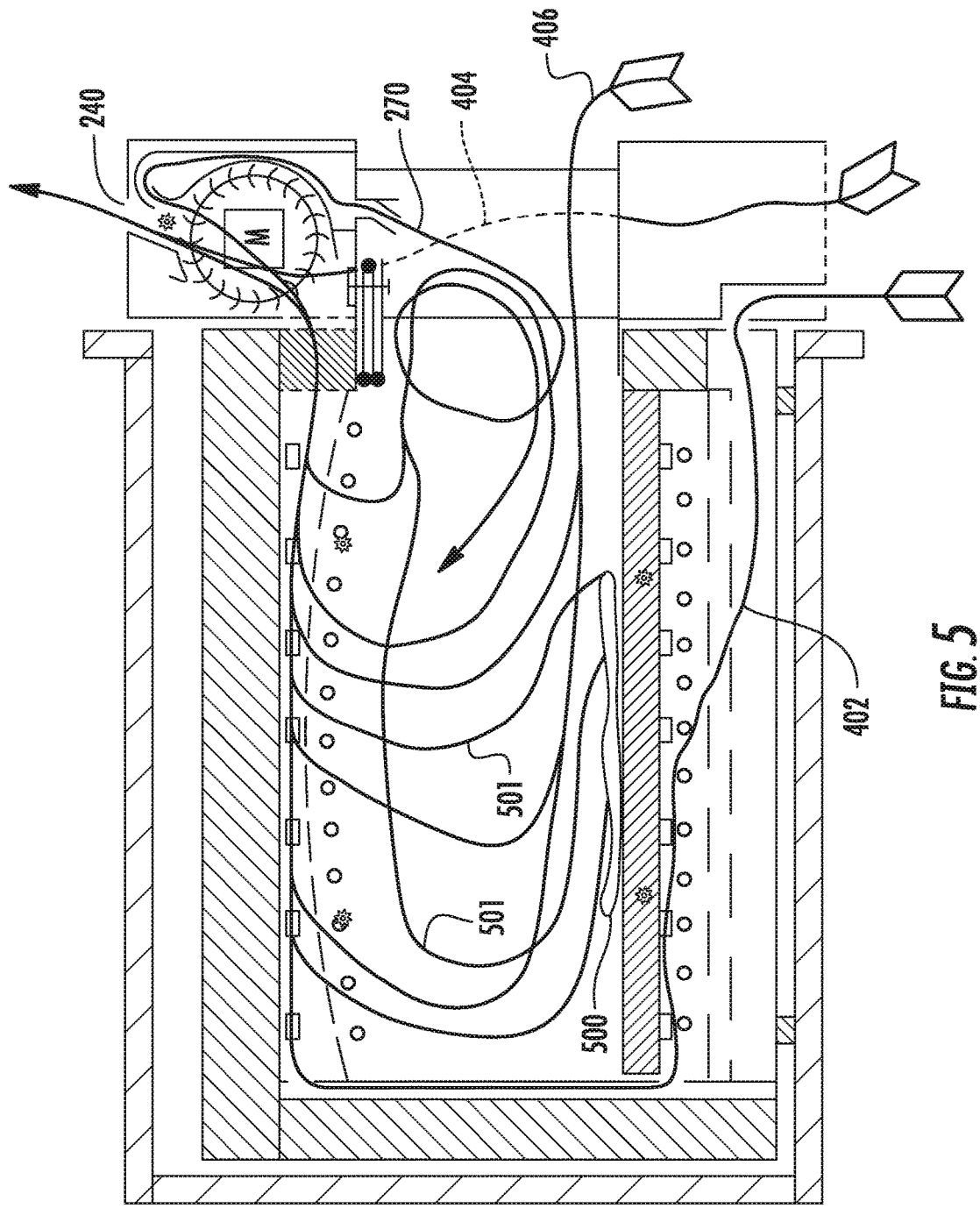
FIG. 5 provides a side section view of the exemplary oven appliance of FIG. 1 with various example flow paths illustrated.

As discussed above, casing 200 is mounted to housing 100. As discussed above, casing 200 includes upper portion 202, lower portion 204, and one or more side portions 206, 208. Casing 200 may be at least partially hollow to define a plenum space 220 therein. Casing 200 also defines intakes 210, e.g., at a bottom portion 204 of casing 200. Intakes 210 are contiguous with ambient air about housing 100 and as such may be considered fresh air intakes. Thus, ambient air about housing 100 may flow into plenum space 220 via intakes 210, e.g., and flow within side portions 206, 208 in plenum space 220 to upper portion 202 of casing 200. In particular, air handler 300, which may be provided as an axial or radial fan, may operate to draw ambient air about housing 100 into air plenum 220 via intakes 210. Further, intakes 210 may comprise a first set of intakes 212 and a second set of intakes 214. In such exemplary embodiments, e.g., as illustrated in FIGS. 4 and 5, the first set of intakes 212 may be in fluid communication with housing 100 to at least partially define a first air flow path 402, while the second set of intakes 214 may be in fluid communication with the plenum space within side portions 206, 208 to at least partially define a second air flow path 404, e.g., that is separate from first air flow path 402 within oven appliance 10. Air handler 300 may be positioned proximate the intakes 210, e.g., at the lower portion 204 of casing 200, or as shown in FIG. 4, air handler 300 may be positioned in the upper portion 202 of casing 200 proximate the venting exit 240 and air curtain outlet 250. Utilizing air handler 300, plenum space 220 may be pressurized relative to ambient air about housing 100. From plenum space 220, the air within plenum space 220 may be supplied to various parts of oven appliance 10, e.g., to assist with cooling oven appliance 10, to assist with regulating a temperature of baking stone 130 and/or to assist with preventing the escape of cooking byproducts from cooking chamber 110 of housing 100.

As illustrated in FIG. 5, first air flow path 402 may extend into baffle 160 through holes 168 of lower plate 166. The air may then flow between upper and lower plates 162, 166 to holes 164 of upper plate 162, and the air may exit baffle 160 at holes 164 of upper plate 162. After exiting holes 164 of upper plate 162, the air may flow between lower heating element array 144 and baking stone 130. The air exiting holes 164 of upper plate 162 may assist with cooling baking stone 130.

In some exemplary embodiments such as illustrated in FIG. 4, housing 100 may include a rear wall 180 positioned opposite opening 120 of housing 110, e.g., along the transverse direction T, and rear wall 180 may also assist with defining cooking chamber 110 of housing 100. As illustrated in FIGS. 4 and 5, in some exemplary embodiments, first air flow path 402 may extend through duct 184 defined by wall 180 between inlet 182 and outlet 186. Smoke and other cooking byproducts 501 may rise from food 500 towards upper portion 112 of cooking chamber 110, and intermingle with air flowing along first air flow path 402 above the perforated reflector 170.

In some exemplary embodiments, such as is illustrated in FIG. 5, second air flow path 404 may provide cooling air for casing 200 as air flows along second air flow path 404 through side portions 206 and 208. Further as illustrated in FIG. 5, first air flow path 402 and second air flow path 404 converge in upper portion 202 of casing 200 upstream of venting exit 240 and air curtain outlet 250. Additionally, some exemplary embodiments may provide a third air flow path 406 whereby ambient air about housing 100 may enter through opening 120 into cooking chamber 110 and intermingle with cooking byproducts 501 within cooking chamber 110.

Oven appliance 10 further includes features for assisting with venting cooking byproducts into the ambient atmosphere about oven appliance 10. In particular exemplary embodiments, such as illustrated in FIG. 4, casing 200 may define a smoke inlet 230 and a venting exit 240. As illustrated in FIG. 5, cooking byproducts 501 from food 500 in cooking chamber 110 of housing 100 rise to upper portion 112 of cooking chamber 110 and exit cooking chamber 110 through smoke reduction catalyst 190 to venting exit 240 and into the ambient atmosphere about housing 100, e.g., upwardly along the vertical direction V away from oven appliance 10. Venting exit 240 permits oven appliance 10 to vent cooking byproducts into an interior atmosphere of a building housing oven appliance 10. Thus, oven appliance 10 need not include or be coupled to venting ducts that direct cooking byproducts to an exterior atmosphere outside of the building housing oven appliance 10. Oven appliance 10 also includes features for treating the cooking byproducts, as discussed in greater detail below.

As may be seen in FIG. 4, oven appliance 100 includes a smoke reduction catalyst 190. Smoke reduction catalyst 190 is positioned between the cooking chamber 110 and smoke inlet 230 of casing 200. Smoke reduction catalyst 190 is configured for reacting with, e.g., cooking fumes and/or smoke in order to reduce emission of undesirable material from venting exit 240. Smoke reduction catalyst 190 may be any suitable smoke reduction catalyst. For example, smoke reduction catalyst 190 may include ceramic plates coated with a noble (non-reactive) metal, such as palladium. The ceramic plates of smoke reduction catalyst 190 may form a honeycomb or other suitable high surface area pattern.

As illustrated in FIG. 5, first, second, and third air flow paths 402, 404, and 406 all converge upstream of venting exit 240. A portion of this confluent air is diverted from venting exit 240 to air curtain outlet 250 by the recirculating duct 260. Thus, the recirculating duct 260 may extend between venting exit 240 and air curtain outlet 250. Air exiting casing 200 via venting exit 240 and air curtain outlet 250 can include various combinations of fresh, heated, and/or mixed combinations of air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical direction, a lateral direction, and a transverse direction, the vertical, lateral, and transverse directions being mutually perpendicular, the oven appliance comprising:
a housing defining a cooking chamber, the cooking chamber extending between a top portion and a bottom portion along the vertical direction, the housing also defining an opening for accessing the cooking chamber of the housing, the cooking chamber extending from the opening to a wall along the transverse direction;
an upper heating element array positioned within the housing at the top portion of the cooking chamber;
a baking stone positioned within the housing at the bottom portion of the cooking chamber;
a lower heating element array positioned within the housing below the baking stone adjacent the bottom portion of the cooking chamber;
a duct at least partially defined by the wall and extending between an inlet defined in the wall below the baking stone and an outlet defined in the wall above the upper heating element array;
a hollow casing mounted to the housing at the opening of the housing, the hollow casing defining a lower portion and an upper portion spaced apart from the lower portion along the vertical direction, the hollow casing comprising an ambient air intake in the lower portion proximate to and contiguous with interior room ambient atmosphere about the housing, a smoke inlet proximate to and contiguous with the cooking chamber, a venting exit in the upper portion proximate to and contiguous with the interior room ambient atmosphere about the housing, and an air curtain outlet proximate to the opening of the housing, wherein the oven appliance defines a first air flow path from the lower portion of the hollow casing to the upper portion of the hollow casing via the duct and a second air flow path from the lower portion of the hollow casing to the upper portion of the hollow casing via a side portion of the hollow casing; and
an air handler located within the hollow casing and operable to cause gases to flow into the ambient air intake and the smoke inlet, such that the gases from each of the ambient air intake and the smoke inlet intermix within the hollow casing and the mixed gases flow to the venting exit and to the air curtain outlet;
wherein the opening of the housing defines a width along the lateral direction, the air curtain outlet also defining a width along the lateral direction, the width of the air curtain outlet being substantially equal to the width of the opening.

2. The oven appliance of claim 1, further comprising a smoke reduction catalyst positioned at the smoke inlet.

3. The oven appliance of claim 1, wherein the air curtain outlet is oriented downward along the vertical direction from a top portion of the hollow casing towards a lower portion of the hollow casing so as to form an air curtain extending vertically across the opening of the cooking chamber during operation of the air handler.

4. The oven appliance of claim 1, wherein the air curtain outlet is oriented back along the transverse direction from the hollow casing towards the cooking chamber so as to form an air curtain preventing vapors from escaping the cooking chamber to the ambient atmosphere via the opening.

5. The oven appliance of claim 1, wherein the air curtain outlet defines a thickness along the transverse direction, the thickness being much less than the width of the air curtain outlet.

6. The oven appliance of claim 1, further comprising a reflector positioned above the upper heating element array, wherein the wall is positioned opposite of the opening and the outlet of the duct is positioned above the reflector, wherein the smoke inlet is in fluid communication with the outlet of the duct above the reflector.

7. The oven appliance of claim 1, further comprising a hook-shaped recirculating duct located proximate to the venting exit, the hook-shaped recirculating duct extending to the air curtain outlet.

8. The oven appliance of claim 1, wherein the smoke inlet is also in fluid communication with the opening and the cooking chamber.

9. An oven appliance defining a vertical direction, a lateral direction, and a transverse direction, the vertical, lateral, and transverse directions being mutually perpendicular, the oven appliance comprising:
a housing defining a cooking chamber, the cooking chamber extending between a top portion and a bottom portion along the vertical direction, the housing also defining an opening for accessing the cooking chamber of the housing, the cooking chamber extending from the opening to a wall along the transverse direction;
an upper heating element array positioned within the housing at the top portion of the cooking chamber;
a reflector positioned above the upper heating element array;
a baking stone positioned within the housing at the bottom portion of the cooking chamber;
a lower heating element array positioned within the housing below the baking stone adjacent the bottom portion of the cooking chamber;
a duct extending from an inlet defined in the wall below the baking stone to an outlet defined in the wall above the reflector; and
a hollow casing defining a lower portion, an upper portion, one or more side portions, and a plenum space within the hollow casing, the one or more side portions extending vertically between the lower portion and the upper portion, the hollow casing extending around the opening of the housing, the lower portion of the casing comprising a plurality of air intakes contiguous with the interior room ambient atmosphere about the housing, the hollow casing defining a first air flow path from a first set of the air intakes, through the plenum space, and to the upper portion of the casing via the cooking chamber, the hollow casing also defining a second air flow path from a second set of the air intakes to the upper portion of the casing through the plenum space via the one or more side portions providing relatively fresh, cool air to the upper portion, the upper portion further comprising a venting exit contiguous with the interior room ambient atmosphere about the housing and an air curtain outlet, the plenum space within the hollow casing also defining a confluence of the first air flow path and the second air flow path in the upper portion upstream of the venting exit and the air curtain outlet such that the confluent air can flow out of the upper portion via the venting exit and the air curtain outlet;

wherein the opening of the housing defines a width along the lateral direction, the air curtain outlet also defining a width along the lateral direction, the width of the air curtain outlet being substantially equal to the width of the opening, and wherein the first air flow path extends from the lower portion of the casing through the duct to the upper portion of the casing.

10. The oven appliance of claim 9, further comprising a hook-shaped recirculating duct configured to divert a portion of the confluent air from the venting exit to the air curtain outlet.

11. The oven appliance of claim 9, further comprising a smoke reduction catalyst positioned between the top portion of the cooking chamber and the upper portion of the casing.

12. The oven appliance of claim 9, wherein the air curtain outlet extends downward along the vertical direction towards the lower portion of the casing so as to form an air curtain extending vertically across the opening of the cooking chamber preventing vapors from escaping the cooking chamber to the ambient atmosphere via the opening.

13. The oven appliance of claim 9, wherein the air curtain outlet extends back along the transverse direction from the hollow casing towards the cooking chamber so as to form an air curtain preventing vapors from escaping the cooking chamber to the ambient atmosphere via the opening.

14. The oven appliance of claim 9, wherein the air curtain outlet defines a thickness along the transverse direction, the thickness being much less than the width of the air curtain outlet to facilitate a calibrated air curtain velocity across the top of the opening.

15. The oven appliance of claim 9, further comprising a third air flow path from the opening, through the plenum space, and to the upper portion of the casing via the cooking chamber.

16. The oven appliance of claim 15, wherein the first air flow path and the third air flow path converge near the top portion of the cooking chamber upstream of the upper portion of the casing.

* * * * *